D. E. GOODENBERGER.
METHOD AND APPARATUS FOR CONSTRUCTING TIRES.
APPLICATION FILED MAR. 15, 1922.
1,438,231.
Patented Dec. 12, 1922.
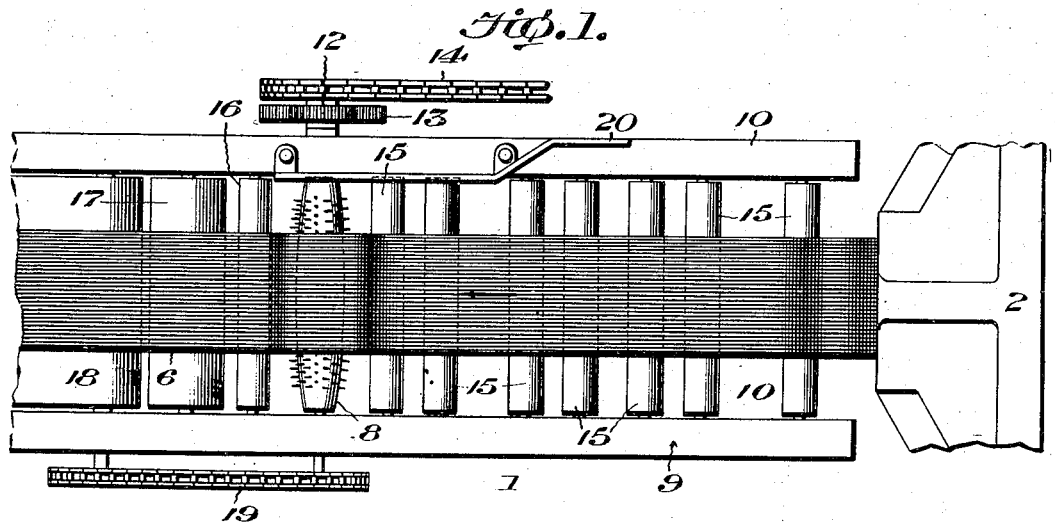
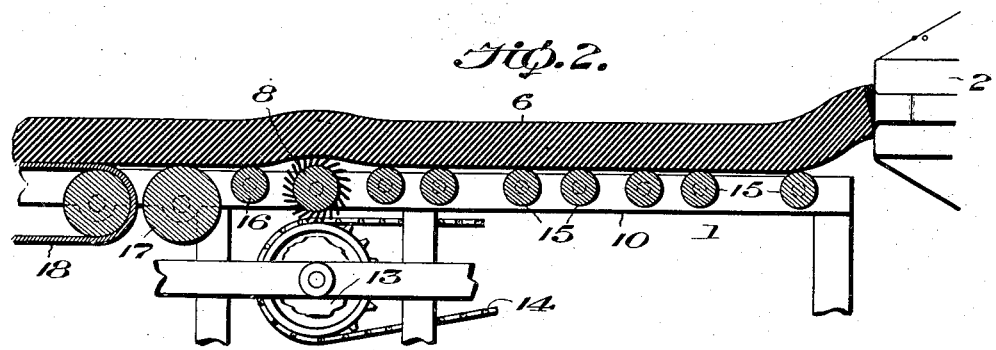
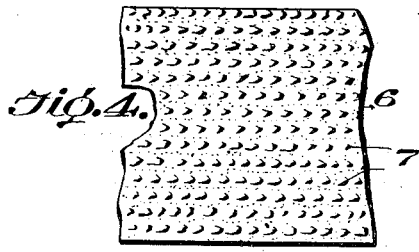
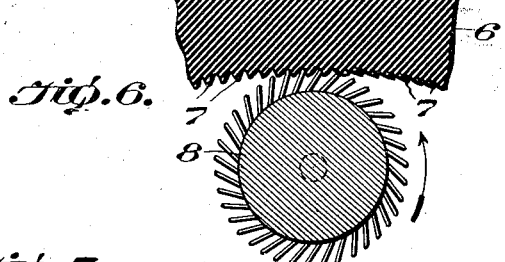
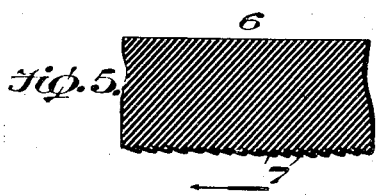
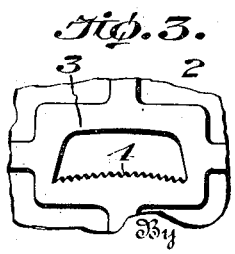
Inventor
Daniel E. Goodenberger Patented Dec. 12, 1922.

1,438,231

UNITED STATES PATENT OFFICE.

DANIEL E. GOODENBERGER, OF AKRON, OHIO, ASSIGNOR TO THE FIRESTONE TIRE AND RUBBER COMPANY, OF AKRON, OHIO, A CORPORATION OF OHIO.

METHOD AND APPARATUS FOR CONSTRUCTING TIRES.

Application filed March 15, 1922. Serial No. 543,910.

*To all whom it may concern:*

Be it known that I, DANIEL E. GOODENBERGER, a citizen of the United States, residing in Akron, in the county of Summit, State of Ohio, have invented certain new and useful Improvements in Methods and Apparatus for Constructing Tires, of which the following is a specification.

My invention relates to improvements in methods of constructing resilient tires, of the solid type, and to apparatus for use in practicing the method.

In the tire manufacturing industry, it is the usual practice to form solid tires by extruding them, in the shape of a slab, from a die that is adapted to pre-shape the slab into the ultimate cross-sectional contour of the tire. The slab is then cut into proper lengths and vulcanized into circular shape usually through the use of a mold. As will be understood in the art, such tires are designed to be secured to a metallic band or rim, usually by the medium of a layer of rubber known as a "hard base". In the extrusion of the rubber forming the tread of the tire, its under surface will be found to contain a large number of small scale-like formations, due to the dragging action of the rubber over the metal of the die, which, in the use of my invention are of particular value in obtaining a perfect union between the slab and the aforesaid rim. This surface takes the form of teeth or jagged protuberances which because of the travel of the slab, through the die, and the pressure forces incident to such travel are wiped back against the slab and so compressed thereagainst that they are, in effect, flattened out. Because of this result their effectiveness, in former practices is seriously impaired. By the use of my invention these scale-like formations may be used to obtain an increased adherence between the tire and the rim, making separation almost impossible.

It is therefore the particular object of my invention to provide an apparatus and method whereby an extruded tire slab may be treated to provide thereon the proper character of surface requisite to the formation of a perfect union between it and its base, or rim, during the subsequent vulcanizing operation, which may be increased by forming the die with saw tooth grooves or ribs on its lower surface.

The invention is also directed toward providing an apparatus through the use of which my method may be practiced in conjunction with the extruding operation.

With these and other objects in view, as will hereinafter become apparent, the invention resides in the broad combination of mechanical elements herein described in their preferred embodiment, and the procedure which may be accomplished through the use of such apparatus, in the manner hereinafter set forth in detail, and illustrated in the drawings accompanying and forming a part of this specification.

In the drawings:

Fig. 1 is a top plan view of one form of apparatus for use in practicing my method, Fig. 2 is a longitudinal sectional view through Fig. 1, Fig. 3 is a fragmentary front elevational view illustrating, conventionally, a form of die used in the practice of my method, Fig. 4 is a bottom plan view, on an enlarged scale, of a portion of a tire as it appears in the initial step of the method, Fig. 5 is a longitudinal sectional view through Fig. 4, and Fig. 6 is an enlarged detail view illustrating further the practice of my method.

Referring to the drawings, the numeral 1 designates generally one form of apparatus which may be used in practicing my method. It is particularly designed to be used in conjunction with an extruding machine a portion of which is shown conventionally at 2. The extruding machine, per se, forms no part of the present invention and will therefore be merely described in brief, herein, in order to point out its relation to the remaining mechanism. It comprises a die 3 through which heated material, under compression therein, is expressed in ribbon or slab form by means, not shown, and in this instance the die is formed as shown in Fig. 3 of the drawings. That is to say it is formed in shape to give the ultimate cross-sectional contour of the tire and includes a convex saw toothed surface 4 that produces a transversely curved serrated surface upon the under face of the ribbon or slab.

The effect of a die of this character, is clearly shown in Figs. 4 and 5 in which 6 designates the slab and 7 the teeth or serrations thereon. It will be noted that the teeth or scale-like formations 7 are compressed against the under surface of the slab in such manner as to lie thereagainst and to be in effect flattened out, and bent backwards with respect to the direction of travel of the slab through the die. In this position their effectiveness, in the capacity in which they are particularly designed to act, is not fully availed of. In order to increase the valuable properties of these scale-like formations, to obtain a more perfect union between the tread portions of the tire and the base, I propose, in effect, to brush or wipe the teeth or scales 7 into an upright position and as the slab 6 is being extruded from the die whereby this result may be accomplished before the rubber or rubber composition has become cool, and in a manner set, in its extruded form.

To this end and as one expedient I mount a corrugated or toothed roller 8 for rotation in a frame 9, the latter comprising side bars 10 disposed in parallelism with the line of movement of the extruded slab. The slab is designed to travel over the roller 8, and, in order that the roller may operate most effectively thereagainst, said roller is disposed a suitable distance from the mouth of the die 3, whereby the weight and drag of the slab causes the teeth of the roller to be firmly embedded in the serrations 7 of said slab. Any suitable form of toothed roller may be employed, but, preferably the teeth thereof are arranged to be presented against the slab at such an angle that a wiping action is effected in the direction of the line of travel of the slab. The arrangement of teeth shown in Fig. 6 has been found practical for such purposes. Preferably the roller 8 is of convex form to conform to the transverse concavity of the slab which has been imparted by the curved surface 4. The roller 8 is designed to be rotated in the direction of travel of the slab 6, which is indicated by the arrow in the drawing, and any suitable form of drive may be utilized for effecting such rotation. As shown in the drawings one end of the roller is provided with a pinion 12 in mesh with a driving pinion 13 which is, in turn driven by a sprocket and chain connection 14. Any suitable devices may be employed for guiding the slab 6 to the roller 8 and to carry it from the die. In this instance I provide a plurality of idler rollers 15 mounted in the frame 10, between the roller 8 and the die 3, and idler rollers 16 and 17 for feeding the slab, from the roller 8, to a conveyor belt 18. The latter element may be positively driven in any suitable manner as by a sprocket and chain connection 19 driven from the roller 8. If desired a guard rail such as that shown at 20 may be utilized in order to prevent displacement of the slab from the aforesaid rollers through carelessness of the operator in properly aligning it as it issues from the die 3.

Through the use of this apparatus, and the procedure set forth in the foregoing, I accomplish an effective preparation of the under face of the extruded slab and in addition to advantageously treating the scale-like formations given by the die I further serrate or roughen the under face of the slab, through the action of the toothed wheel 8, which serves to brush up the scales and cause them to stand out from the body of the tire. By so treating the under surface of the tire, a closer and more perfect adhesion is obtained than is possible with operations in use prior to my invention. After being treated in the manner described the tread portion of the tire is applied to the rim and vulcanized thereon.

Although I have described my invention in detail it is to be understood that the present disclosure is illustrated in character and not to be construed as restricting the scope or spirit of the invention unless such restrictions are expressly indicated in the claims appended hereto.

Claims:

1. The combination with means for extruding a strip of vulcanizable material, of means for supporting the strip as it issues from the extruding means, and devices associated with the supporting means adapted to brush up the under side of the strip.

2. The combination with means for extruding a strip of vulcanizable material, of means for supporting the strip as it issues from the extruding means, and devices associated with the supporting means adapted to wipe up the scale-like formation on the under side of the strip and cause them to stand out from the surface of the tire.

3 The combination with means for extruding a strip of vulcanizable material, of means for supporting the strip as it issues from the extruding means, and devices associated with the supporting means adapted to rotate with a wiping action against the underside of the strip and to cause the scale-like formations on the underside thereof to stand out from the lower surface of the strip.

4. The combination with a strip extruding mechanism including a die, of means adapted to support the strip for movement thereon as it issues from the die, and devices associated with the supporting means adapted to brush up a surface of the strip in the direction of movement of the strip.

5. The combination with a strip extruding mechanism including a die, of means adapted to support the strip for movement thereon as it issues from the die, devices associated with the supporting means adapted to brush a surface of the strip in the direction of the movement of the strip, and means for conveying the strip from said devices.

6. The combination with a strip extruding mechanism including a die for serrating one side of the strip, of means adapted to support the strip for movement thereon as it issues from the die, and a rotatable element associated with the supporting means adapted to brush a surface of the strip in the direction of movement of the strip.

7. The combination with a strip extruding mechanism including a die for serrating the underside of the strip, of a frame, a plurality of horizontally disposed idler rollers arranged to support the strip for longitudinal movement thereon as it issues from the die, a toothed roller adapted to engage the under side of the strip with a rotary wiping action as it passes from the supporting rollers, a conveyor arranged to receive the strip from the toothed roller, and driving mechanism for simultaneously actuating the conveyor and said toothed roller.

8. The herein described method comprising, forming a strip of vulcanizable material, and brushing up a surface of the strip after it has been formed to cause the scale-like formations on the surface of the strip to stand out from the strip.

9. The herein described method comprising, extruding a strip of vulcanizable material, forming a serrated surface on one side thereof, and brushing the surface of the strip in the direction of movement of the strip.

10. The herein described method comprising, extruding a strip of vulcanizable material, forming a serrated surface thereon simultaneously with the extruding operation, supporting the strip for longitudinal movement as it is being extruded, and brushing the surface of the strip in the direction of movement of the strip.

11. The herein described method of treating rubber, comprising extruding it from a die in the form of a strip, and then causing the scale-like formations on the surface of the strip to stand outwardly from the surface.

12. The herein described method of preparing a tread strip for solid tires comprising. extruding it from a die, and subjecting the under surface of the strip to a brushing action, which causes the scales thereon to stand outwardly from the surface of the rubber.

13. The method of manufacturing solid tires, comprising, forming the tread of the tire by an extruding operation, the said operation forming a scale-like surface on the underside of the die, then roughening the surface preparatory to applying the tread to a rim, and vulcanizing it on the rim.

14. The method of manufacturing solid tires, comprising forming the tread of the tire by an extruding operation, the said operation forming a plurality of scales on the under surface of the tire which lie against the surface of the tire, causing the scales on the under surface of the tire to stand up from the surface of the tire, then applying the tread to a rim and vulcanizing it thereon.

DANIEL E. GOODENBERGER.